(12) United States Patent
Petit et al.

(10) Patent No.: US 11,808,970 B2
(45) Date of Patent: Nov. 7, 2023

(54) OPTICAL FIBER WITH VARIABLE ABSORPTION

(71) Applicant: Lumentum Operations LLC, San Jose, CA (US)

(72) Inventors: Vincent Petit, Cupertino, CA (US); Martin H. Muendel, Oakland, CA (US)

(73) Assignee: Lumentum Operations LLC, San Jose, CA (US)

(*) Notice: Subject to any disclaimer, the term of this patent is extended or adjusted under 35 U.S.C. 154(b) by 0 days.

(21) Appl. No.: 17/454,709

(22) Filed: Nov. 12, 2021

(65) Prior Publication Data

US 2022/0077643 A1    Mar. 10, 2022

Related U.S. Application Data

(63) Continuation-in-part of application No. 16/657,070, filed on Oct. 18, 2019, now Pat. No. 11,175,449.

(Continued)

(51) Int. Cl.
*G02B 6/02*      (2006.01)
*H01S 3/067*     (2006.01)
(Continued)

(52) U.S. Cl.
CPC .... *G02B 6/02295* (2013.01); *C03B 37/01211* (2013.01); *C03B 37/027* (2013.01);
(Continued)

(58) Field of Classification Search
CPC ............ G02B 6/02295–0238; C03B 37/02763
See application file for complete search history.

(56) References Cited

U.S. PATENT DOCUMENTS

| 4,372,645 A | 2/1983 | Miller |
| 4,815,079 A | 3/1989 | Snitzer et al. |

(Continued)

FOREIGN PATENT DOCUMENTS

| CN | 101884146 A | 11/2010 |
| CN | 102812389 A | 12/2012 |

(Continued)

OTHER PUBLICATIONS

Liu A., et al., "The Absorption Characteristics of Circular, Offset, and Rectangular Double-clad Fibers," Optics Communications, 1996, vol. 132, pp. 511-518.

(Continued)

*Primary Examiner* — Michael Stahl
(74) *Attorney, Agent, or Firm* — Harrity & Harrity, LLP

(57) ABSTRACT

An optical fiber may comprise a core doped with one or more active ions to guide signal light from an input end of the optical fiber to an output end of the optical fiber, a cladding surrounding the core to guide pump light from the input end of the optical fiber to the output end of the optical fiber, and one or more inserts formed in the cladding surrounding the core. The core may have a geometry (e.g., a cross-sectional size, a helical pitch, and/or the like) that varies along a longitudinal length of the optical fiber, which may cause an absorption of the pump light to be modulated along the longitudinal length of the optical fiber.

21 Claims, 9 Drawing Sheets

Related U.S. Application Data

(60) Provisional application No. 62/787,555, filed on Jan. 2, 2019.

(51) Int. Cl.
*C03B 37/027* (2006.01)
*C03B 37/012* (2006.01)

(52) U.S. Cl.
CPC .... *C03B 37/02763* (2013.01); *G02B 6/02376* (2013.01); *H01S 3/06716* (2013.01); *H01S 3/06745* (2013.01); *C03B 2201/10* (2013.01); *C03B 2201/12* (2013.01); *C03B 2201/28* (2013.01); *C03B 2201/31* (2013.01); *C03B 2203/20* (2013.01); *C03B 2203/22* (2013.01)

(56) References Cited

U.S. PATENT DOCUMENTS

| | | |
|---|---|---|
| 5,508,842 A | 4/1996 | Takeda et al. |
| 5,533,163 A | 7/1996 | Muendel |
| 6,157,763 A | 12/2000 | Grubb et al. |
| 6,795,635 B1 | 9/2004 | Fajardo et al. |
| 8,774,581 B2 | 7/2014 | Tanaka et al. |
| 11,175,449 B2 | 11/2021 | Petit et al. |
| 2001/0038740 A1 | 11/2001 | Hasegawa et al. |
| 2002/0094159 A1 | 7/2002 | Goldberg et al. |
| 2003/0035631 A1 | 2/2003 | Eggleton et al. |
| 2004/0105640 A1 | 6/2004 | Hasegawa |
| 2004/0114897 A1 | 6/2004 | Koshiba et al. |
| 2006/0187534 A1 | 8/2006 | Hodder et al. |
| 2007/0237453 A1 | 10/2007 | Nielsen et al. |
| 2008/0267229 A1 | 10/2008 | Kojima et al. |
| 2010/0247047 A1 | 9/2010 | Filippov et al. |
| 2011/0274129 A1 | 11/2011 | Bauer et al. |
| 2016/0047981 A1 | 2/2016 | Filgas et al. |
| 2017/0010410 A1 | 1/2017 | Koponen et al. |

FOREIGN PATENT DOCUMENTS

| | | | |
|---|---|---|---|
| CN | 107544113 A | 1/2018 | |
| JP | 2005062477 A | 3/2005 | |
| JP | 2005301024 A | 10/2005 | |
| JP | 2006010961 A | 1/2006 | |
| JP | 2006017816 A | 1/2006 | |
| JP | 2007-250951 A * | 9/2007 | ............ G02B 6/032 |
| JP | 2007250951 A | 9/2007 | |
| JP | 2014139114 A | 7/2014 | |
| WO | 9210014 A1 | 6/1992 | |
| WO | 03058309 A1 | 7/2003 | |
| WO | WO 2021/152202 A1 * | 8/2021 | |

OTHER PUBLICATIONS

Zellmer H., et al., "High-power CW Neodymium-doped Fiber Laser Operating at 9.2 W with High Beam Quality," Optics Letters, 1995, vol. 20 (6), pp. 578-580.

* cited by examiner

OPTICAL FIBER WITH VARIABLE ABSORPTION

RELATED APPLICATION

This application claims the benefit of U.S. Provisional Patent Application No. 62/787,555, entitled "OPTICAL FIBER WITH VARIABLE ABSORPTION," filed on Jan. 2, 2019, and is a continuation-in-part of U.S. patent application Ser. No. 16/657,070, entitled "OPTICAL FIBER WITH VARIABLE ABSORPTION," filed on Oct. 18, 2019, the contents of which are incorporated by reference herein in their entirety.

TECHNICAL FIELD

The present disclosure generally relates to an optical fiber, and more particularly, to an optical fiber that has a variable absorption along a longitudinal length.

BACKGROUND

In an optical fiber, attenuation refers to a reduction in intensity or a loss of optical power as light propagates within the optical fiber. In general, attenuation may be caused by absorption, scattering, bending losses, and/or the like. For example, absorption may cause signal loss in an optical fiber during optical transmission due to materials in the optical fiber absorbing light power and converting the absorbed light power into another energy form, such as heat, due to molecular resonance, wavelength impurities, and/or the like.

SUMMARY

According to some implementations, an optical fiber includes a core doped with one or more active ions to guide signal light from an input end of the optical fiber to an output end of the optical fiber; a cladding surrounding the core to guide pump light from the input end of the optical fiber to the output end of the optical fiber; and one or more inserts formed in the cladding surrounding the core, wherein the core has a geometry that varies along a longitudinal length of the optical fiber, and wherein the geometry of the core is varied along the longitudinal length of the optical fiber to cause an absorption of the pump light to be modulated along the longitudinal length of the optical fiber.

According to some implementations, a method includes forming, in a preform comprising a core region and a cladding region surrounding the core region, one or more holes in the cladding region; and drawing the preform to form an optical fiber comprising a core formed in the core region, a cladding formed in the cladding region, and one or more inserts formed in the one or more holes, wherein drawing the preform comprises varying a geometry of the one or more inserts along a longitudinal length of the optical fiber while drawing the preform.

According to some implementations, a method includes forming, in a preform comprising a core region and a cladding region surrounding the core region, one or more holes in the cladding region; and drawing the preform to form an optical fiber comprising a core formed in the core region, a cladding formed in the cladding region, and one or more inserts formed in the one or more holes, wherein drawing the preform comprises varying a geometry of the core along a longitudinal length of the optical fiber while drawing the preform.

According to some implementations, an optical fiber may include: a core doped with one or more active ions to guide signal light from an input end of the optical fiber to an output end of the optical fiber; a cladding surrounding the core to guide pump light from the input end of the optical fiber to the output end of the optical fiber; and one or more inserts formed in the cladding surrounding the core, wherein each of the one or more inserts has a geometry that varies along a longitudinal length of the optical fiber, and wherein the geometry of the one or more inserts is varied along the longitudinal length of the optical fiber to cause an absorption of the pump light to be modulated along the longitudinal length of the optical fiber.

According to some implementations, a method may include: forming, in a preform including a core region and a cladding region surrounding the core region, one or more holes in the cladding region; and drawing the preform to form an optical fiber including a core formed in the core region, a cladding formed in the cladding region, and one or more inserts formed in the one or more holes, wherein drawing the preform includes varying a geometry of the one or more inserts along a longitudinal length of the optical fiber while drawing the preform.

According to some implementations, a method may include: reducing a population of meridional modes in pump light to be pumped into a variable-absorption fiber having a core doped with one or more active ions and a cladding surrounding the core to guide the pump light from an input end of the variable-absorption fiber to an output end of the variable-absorption fiber, wherein the population of meridional modes in the pump light is reduced relative to a uniform mix of modes supported by the cladding surrounding the core; and causing the pump light to be pumped into the variable-absorption fiber after the population of meridional modes is reduced, wherein the variable-absorption fiber includes one or more inserts that are formed in the cladding surrounding the core with a geometry that causes an absorption of the pump light to be modulated along a longitudinal length of the variable-absorption fiber.

DETAILED DESCRIPTION

Figure 1A:
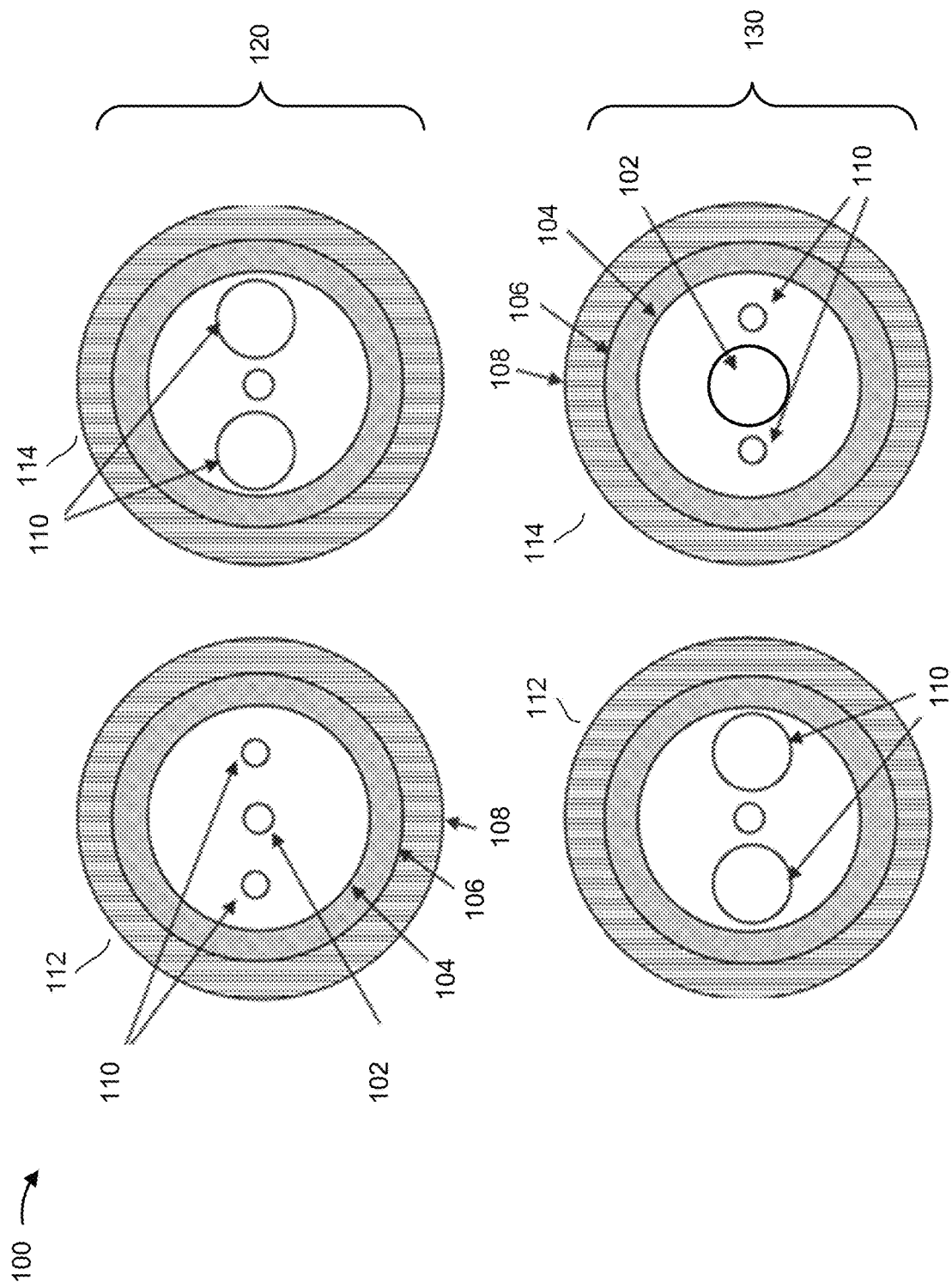
FIGS. 1A-1C are diagrams of example cross-sectional views of one or more example implementations of an optical fiber with a variable absorption described herein.

The following detailed description of example implementations refers to the accompanying drawings. The same reference numbers in different drawings may identify the same or similar elements.

Doped active optical fibers generally have a constant rate of absorption per unit length. For example, if the rate of absorption is one (1) percent per centimeter, a doped active optical fiber will generally absorb 1% of input light in the first centimeter of the optical fiber, 1% of the remaining input light in the second centimeter of the optical fiber, and so on. As a result, when doped active optical fibers are pumped from one end, there is greater total absorption, heating, inversion, and photodarkening near the pumped end compared to the middle and the far end of the fiber. Therefore, laser performance is limited by the fiber at the pumped end, and much of the fiber is essentially underutilized. For example, in a double-clad fiber laser, pump light is typically launched at one end of an active fiber and the pump light is absorbed along a length of the active fiber, with pump power approximately following a Beer's Law behavior (negative exponential). Therefore, the pump-input end of the active fiber exhibits a higher pump density, resulting in a typically higher inversion of population, a higher photodarkening rate, a higher elevation of temperature, a higher susceptibility to instabilities, and/or the like. These effects are a challenge to power scalability of the fiber laser.

In general, one way to reduce the foregoing effects is to control fiber absorption along a length of the fiber so that the inversion of population, the photodarkening rate, the temperature rise, and instability susceptibility remain within acceptable bounds throughout the fiber length. However, because of the nature of the fiber production process (e.g., where a one (1) meter long preform typically provides on the order of one (1) kilometer of fiber, corresponding to on the order of 100 fiber lasers), varying absorption of a fiber core over one fiber laser length directly is not straightforward when the preform material is deposited. Accordingly, one technique to manage the fiber absorption may be to fabricate and splice together multiple fibers with different concentrations of active ions and/or different active core diameters rather than using a single active fiber. In this case, the first fiber presents a lower absorption coefficient to compensate for a higher pump density in the first fiber, and subsequent fibers have incrementally higher absorption. This technique presents several drawbacks, however, including that the fiber temperature will rise abruptly at each splice, and at least two different active fibers have to be engineered in parallel. This further complicates fabrication of active preforms and fiber handling (splicing), and therefore increases production costs. Additionally, each splice causes significant loss to both the signal and the pump in the fiber at the splice point, which reduces system efficiency. Further, each splice is a potential failure point, which decreases system reliability.

In addition to core size and active-ion concentration, another factor affecting pump absorption in active fibers (e.g., double-clad or triple-clad active fibers) is a level of pump scrambling. For example, in a round fiber with a centered core, a majority of pump modes do not overlap the core significantly due to rotational symmetry. If pump light is launched uniformly into a pump-guiding inner cladding region, as soon as the small portion of pump light overlapping the core (meridional modes) is absorbed, the remaining pump light is in modes that orbit the core (skew modes) and have very low absorption. In a non-polarization-maintaining fiber, one solution to this problem is to use a non-round shape for the inner cladding, such as a hexagonal or octagonal shape. Shaping the fiber away from round or elliptical may remove the split between meridional and skew modes, causing all modes to have substantial core overlap and relatively uniform absorption. This effect is referred to as pump scrambling.

In a polarization-maintaining double-clad fiber with large Panda-style (e.g., polarization-maintaining and absorption-reducing) stress rods in the inner cladding, the stress rods typically have a refractive index that differs from the surrounding glass. The stress rods therefore break symmetry of the pump region and induce similar levels of pump scrambling as non-round shapes in non-polarization-maintaining fibers. As a result, most polarization-maintaining double-clad fibers use round inner cladding shapes and rely on the stress rods for pump scrambling. Accordingly, in both polarization-maintaining and non-polarization-maintaining fibers, an efficacy of the pump scrambling depends on the strength of the departure from a round inner cladding. For example, using a twenty-sided polygon or a Panda structure with very small stress rods will typically not cause significant pump scrambling.

Some implementations described herein relate to an optical fiber that has a variable absorption along a longitudinal length of the optical fiber. For example, as described in further detail herein, the optical fiber may have a design that allows a pump absorption rate to be gradually tuned longitudinally along each usable length of the optical fiber, where a core material in the optical fiber is conventional and uniform along the longitudinal length. In some implementations, the absorption rate may be tuned by using one or more inserts or holes in an inner cladding of the optical fiber and by tuning a geometry along the longitudinal length of the optical fiber during a fabrication process in order to modulate a pump scrambling rate. For example, in some implementations, the insert(s) may have a cross-sectional size, a helical pitch, and/or the like that varies along the longitudinal length of the optical fiber to vary the pump scrambling rate and thereby modulate the fiber absorption (e.g., with scrambling and absorption minimized at an input end where a pump is launched and with scrambling and absorption maximized at an opposite (e.g., output) end where pump power is relatively lower. Additionally, or alternatively, the one or more inserts may have a higher refractive index than the inner cladding, which may cause the inserts to trap pump light near the input end of the optical fiber and release the trapped pump light downstream into the inner cladding to be absorbed. In this case, the inserts may have a larger cross-sectional size at the input end of the optical fiber and the cross-sectional size may be downtapered at the point where the trapped pump light is released. Various processes for fabricating or manufacturing such an optical fiber with variable absorption and for using such an optical fiber with variable absorption are also provided below.

Figure 1B:
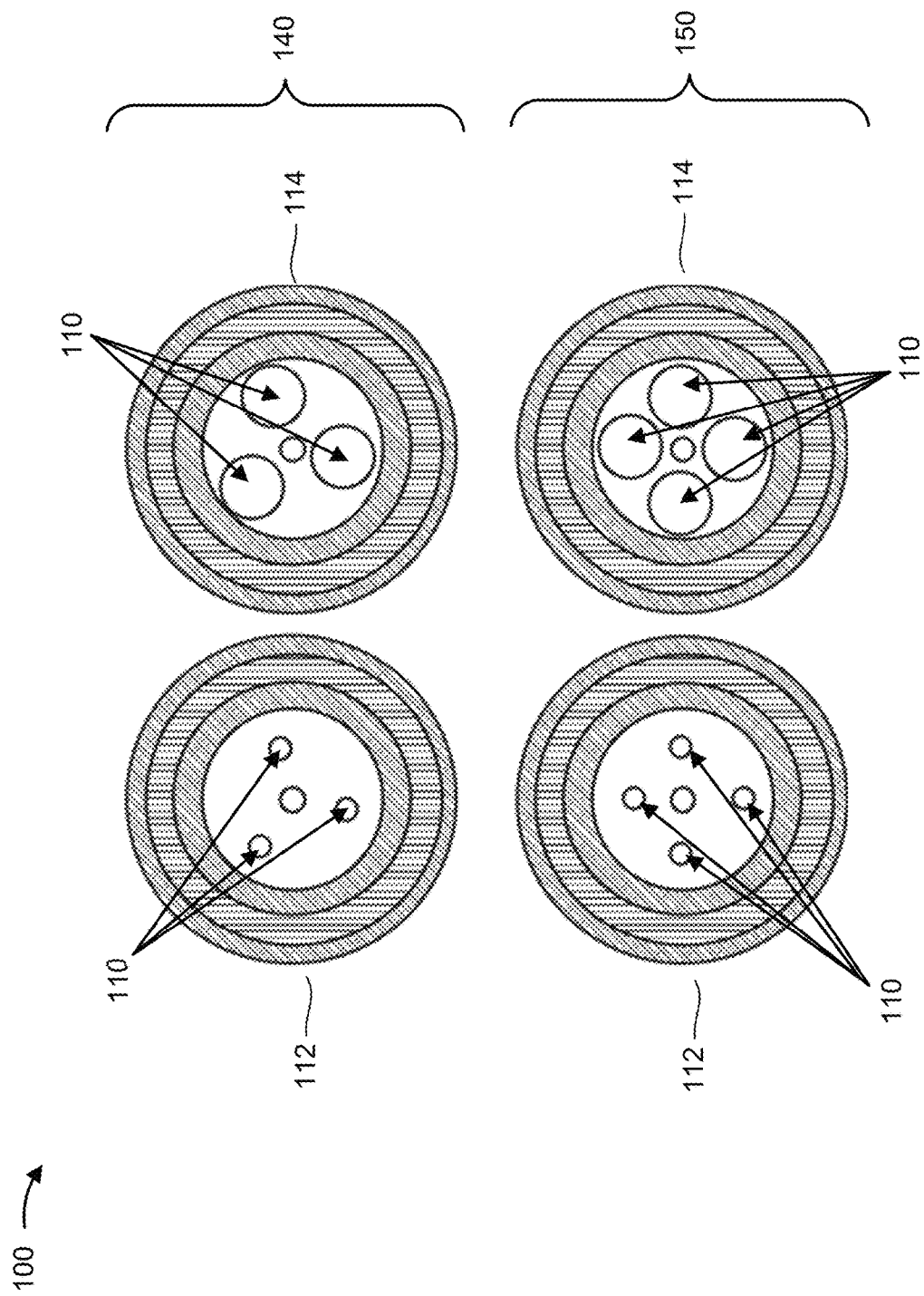
Figure 1C:
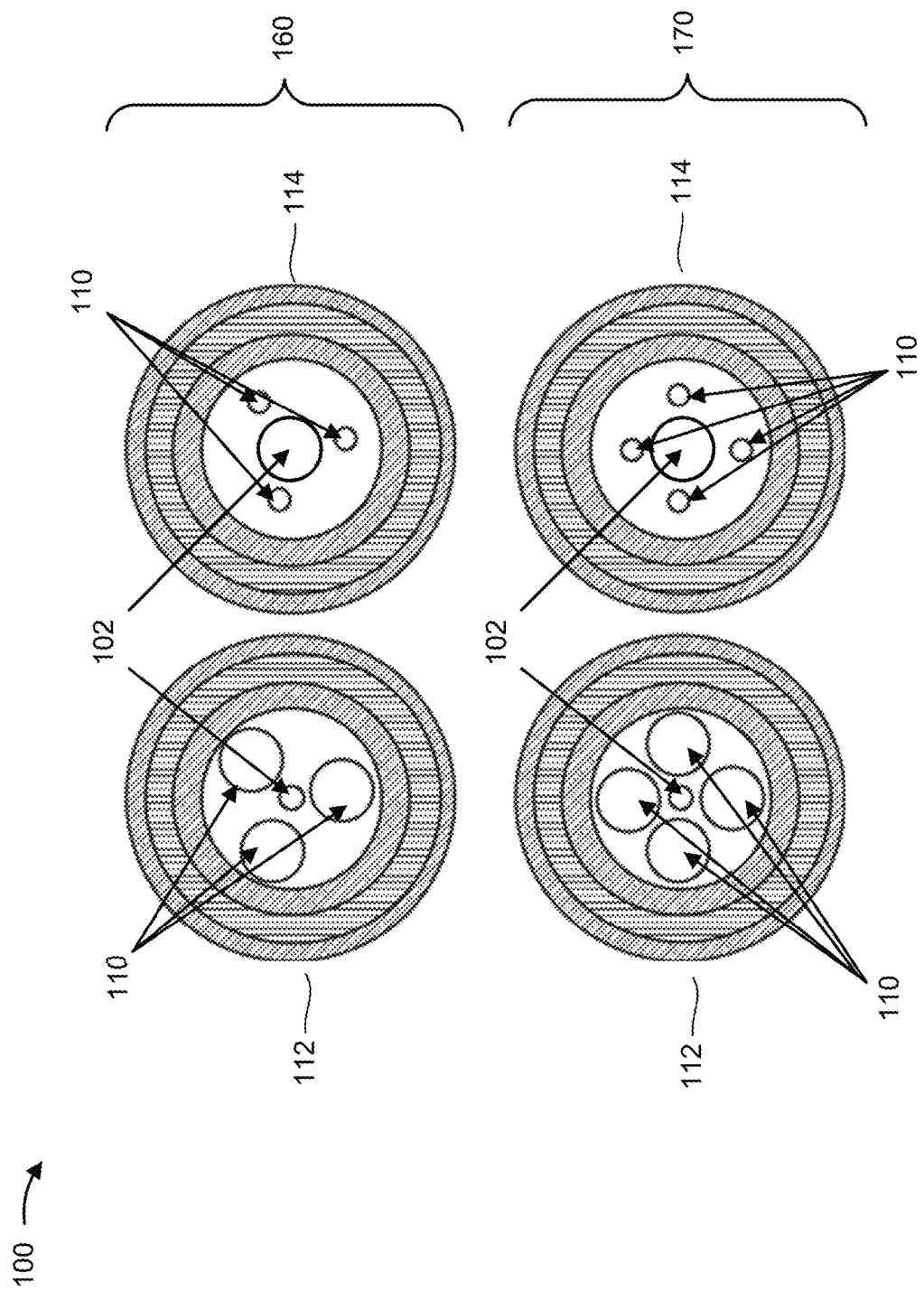

FIGS. 1A-1C are diagrams of example cross-sectional views of one or more example implementations of an optical fiber with a variable absorption described herein. For example, in some implementations, the optical fiber may be a double-clad optical fiber (e.g., as shown in FIG. 1A) or a triple-clad optical fiber (e.g., as shown in FIGS. 1B and 1C) for improved pump power handling.

As shown in FIG. 1A, and reference number 120, the optical fiber with variable absorption may include a core 102 doped with one or more active ions to guide signal light from an input end of the optical fiber to an output end of the optical fiber, an inner cladding 104 surrounding the core 102 to guide pump light from the input end of the optical fiber to the output end of the optical fiber, a pump cladding 106 surrounding the inner cladding 104, a fiber coating 108 surrounding the pump cladding 106, and one or more inserts 110 that are formed in the inner cladding 104. In some implementations, the pump cladding 106 may be a depressed clad used to guide a pump, and may include a depressed glass clad, a low-index coating, a low-index glass, an air clad, and/or the like. Furthermore, in some implementations, the fiber coating 108 may include a low index coating material, a high index coating material, and/or the like.

In some implementations, the one or more inserts 110 may be solid inserts, hollow holes or cavities that are filled with a liquid or a gas (e.g., air), and/or the like, and the insert(s) 110 may be formed in the pump-guiding inner cladding 104 to act as anti-guides. Furthermore, the one or more inserts 110 may each have a geometry that varies along a longitudinal length of the optical fiber, and the varied geometry of the one or more inserts 110 may cause an absorption of the pump light to be modulated along the longitudinal length of the optical fiber. For example, in some implementations, the one or more inserts 110 may have a cross-sectional size that varies along the longitudinal length of the optical fiber to vary a pump scrambling rate and thereby modulate absorption of the pump light along the longitudinal length of the optical fiber. In such cases, the optical fiber may include a first end 112 arranged to be an input end where pump light is launched into the optical fiber, and the one or more inserts 110 may have a comparatively smaller cross-sectional size for minimal scrambling and/or moderate absorption at the input end. At an opposite end 114, which may be configured as an output end in this example, the inserts 110 can be comparatively larger in order to maximize the scrambling and/or absorption where the pump power is lower. In some implementations, the inserts 110 can be tapered to zero at the first end 112 of the optical fiber, such as when the one or more inserts 110 are hollow and filled with air or another suitable gas.

As shown by reference number 130, in some aspects, the core 102 may have a geometry that varies along a longitudinal length of the optical fiber, and the varied geometry of the core 102 may, alone or in combination with the variations in the geometry of the one or more inserts 110, cause an absorption of the pump light to be modulated along the longitudinal length of the optical fiber. For example, in some implementations, the core 102 may have a cross-sectional size that varies along the longitudinal length of the optical fiber to modulate absorption of the pump light along the longitudinal length of the optical fiber. In such cases, at the first end 112 (e.g., the input end), the core 102 may have a comparatively smaller cross-sectional size for moderate absorption. At the opposite end 114 (e.g., the output end), the core 102 can be comparatively larger in order to maximize the absorption where the pump power is lower. For example, a larger core may have a higher absorption than a smaller core due to a larger core being capable of holding more dopant than a smaller core.

In general, the optical fiber can include any suitable quantity of inserts 110. For example, while FIG. 1A illustrates an example double-clad optical fiber with two inserts 110, in other designs, the optical fiber may be a triple-clad optical fiber for improved pump power handling. Additionally, or alternatively, the optical fiber may have one insert 110, more than two inserts 110, and/or the like. For example, FIGS. 1B and 1C illustrate other possible designs for the optical fiber with variable absorption. For example, as shown by reference numbers 140 and 160, the optical fiber may have a triple-clad design with three inserts 110. In another example, as shown by reference numbers 150 and 170, the optical fiber may have a triple-clad design with four inserts 110.

As indicated above, FIGS. 1A-1C are provided merely as one or more examples. Other examples may differ from what is described with regard to FIGS. 1A-1C.

Figure 2A:
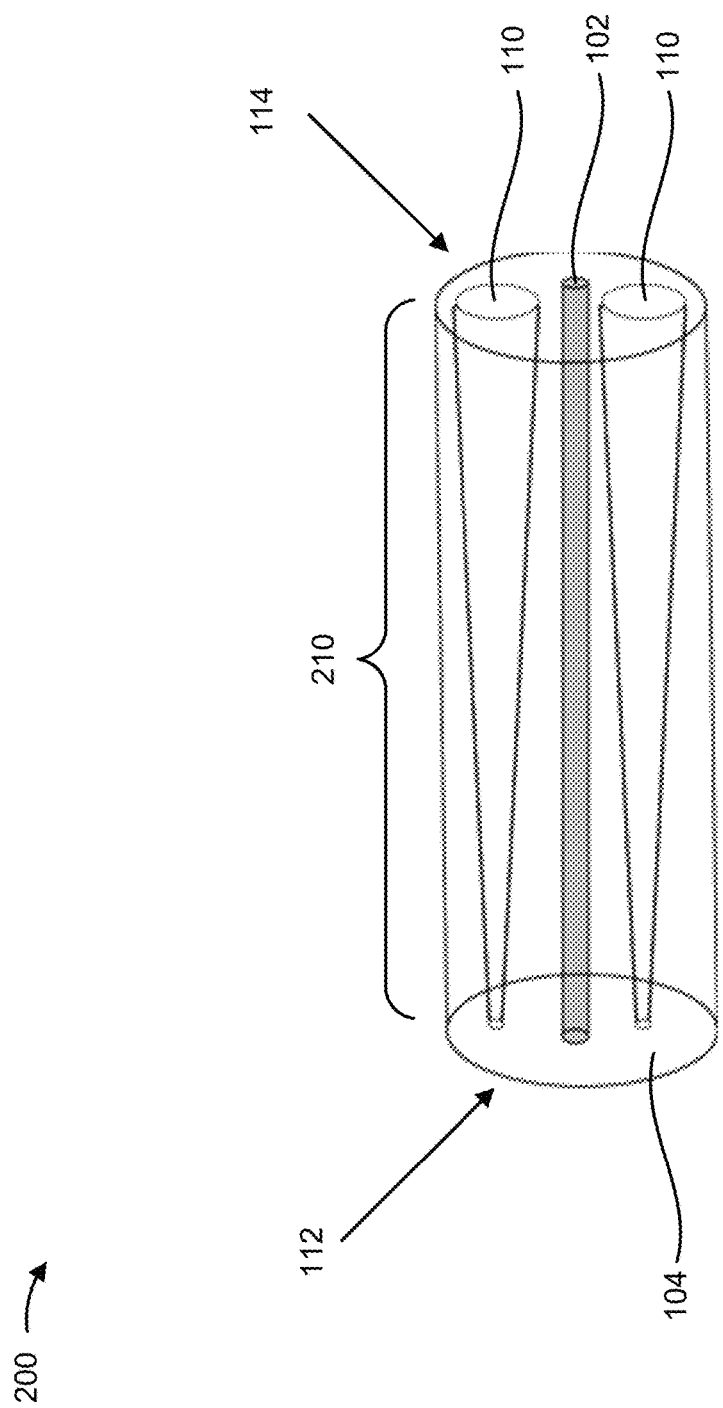
FIGS. 2A and 2B are diagrams of example longitudinal views of optical fibers with a variable absorption described herein.
Figure 2B:
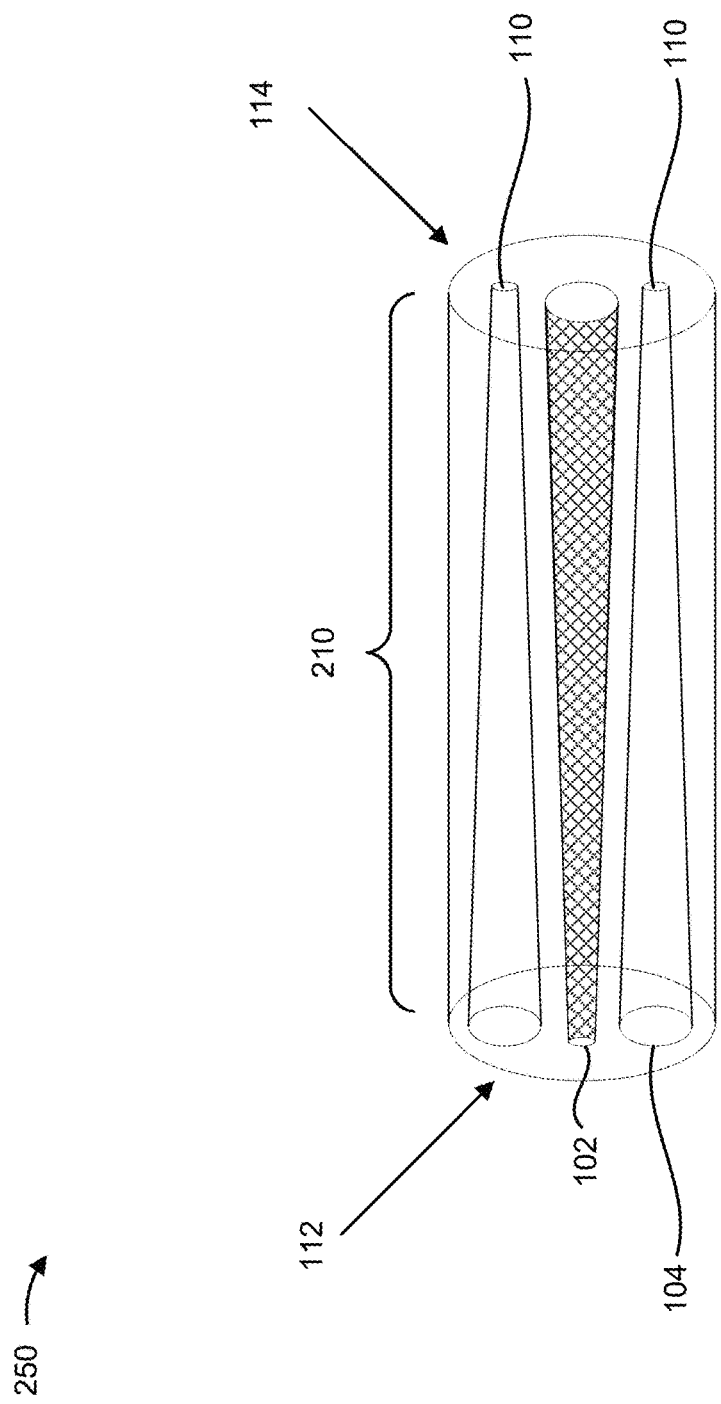

As described above, in some implementations, the one or more inserts 110 formed in the inner cladding 104 may have a geometry that varies along a longitudinal length of the optical fiber, and the varied geometry of the one or more inserts 110 may cause an absorption of pump light to be modulated along the longitudinal length of the optical fiber. FIGS. 2A and 2B are diagrams of example longitudinal views 200 and 250 of optical fibers with a variable absorption described herein.

For example, in FIG. 2A, a cross-sectional size of the one or more inserts 110 may vary along a longitudinal length 210 of the optical fiber to vary a pump scrambling rate and thereby modulate absorption along the longitudinal length 210 of the optical fiber. Accordingly, in a system where the pump is launched at end 112, the one or more inserts 110 have a comparatively smaller cross-sectional size for minimal scrambling and moderate absorption, and the cross-sectional size of the one or more inserts 110 gradually increases along the longitudinal length 210 of the optical fiber, reaching a maximum cross-sectional size at the far (e.g., output) end 114 to maximize absorption where the pump power is lower. In general, the gradual increase of the cross-sectional size of the one or more inserts 110 may cause a pump scrambling rate to gradually increase from the end 112 where the pump is launched to the far (e.g., output) end 114, thereby causing absorption of pump light to increase along the longitudinal length 210.

In some implementations, the one or more inserts 110 may have a refractive index that is lower than an index of the inner cladding 104 in order to avoid trapping pump power in the one or more inserts 110. For example, in cases where the inner cladding 104 is an undoped fused silica clad, suitable low-index materials that can be used for the one or more inserts 110 may include boron-doped fused silica, fluorine-doped fused silica, aluminum and phosphorous co-doped fused silica, air or other gases, water, a low-index liquid, and/or the like. Alternatively, in cases where the inner cladding 104 is a doped inner-clad, the one or more inserts 110 may be made from any suitable dopant(s) that has a lower index than the inner cladding 104 and enables the one or more inserts 110 to act as anti-guides.

Alternatively, in some implementations, the one or more inserts 110 may have a refractive index that is higher than the index of the inner cladding 104 to trap pump power in the one or more inserts 110. For example, the one or more inserts 110 may be formed using an up-dopant, such as germanium, aluminum, phosphorous, titanium, a rare-earth element or rare-earth metal, and/or the like, which may cause pump light to be trapped in the one or more inserts 110. In this case, the pump light may be pumped into the optical fiber at the end 114 where the one or more inserts 110 have a larger cross-sectional size, and the trapped pump light may be released downstream into the inner cladding 104 to be absorbed where the cross-sectional size of the one or more inserts 110 tapers down. Accordingly, in this example, absorption of pump light along the longitudinal length 210 of the optical fiber may be modulated by forming the one or more inserts 110 with a larger cross-sectional size at the end 114 where the pump light is to be pumped into the optical fiber and by down-tapering the cross-sectional size of the one or more inserts 110 downstream at a point where the trapped pump power is to be released.

In some implementations, pump light may be pumped into the optical fiber at multiple locations along the longitudinal length 210 of the optical fiber, and the geometry of the one or more inserts 110 may vary along the longitudinal length 210 of the optical fiber to provide a decrease in the absorption of pump light in one or more regions that are proximal to the multiple locations where the pump light is pumped into the optical fiber.

For example, in some implementations, the optical fiber may be pumped from both ends 112, 114, in which case absorption may be tuned to be lowest at the ends 112, 114 and highest in the middle of the longitudinal length 210 of the optical fiber. For example, where the one or more inserts 110 have a lower refractive index than the inner cladding 104 and are configured to modulate absorption along the longitudinal length 210 of the optical fiber by varying a pump scrambling rate, a cross-sectional size of the one or more inserts 110 may be comparatively small (or tapered all the way to zero, such as when the one or more inserts 110 are hollow and filled with gas) at end 112, and the cross-sectional size of the one or more inserts 110 may gradually increase until reaching a maximum at a mid-point of the longitudinal length 210 of the optical fiber. The cross-sectional size of the one or more inserts 110 may then down-taper towards the other end 114, whereby absorption may be low at both ends 112 and high at the mid-point of the longitudinal length 210 of the optical fiber. Alternatively, where the one or more inserts 110 have a higher refractive index than the inner cladding 104 and are configured to modulate absorption along the longitudinal length 210 of the optical fiber by trapping pump light and releasing the trapped pump light downstream, the cross-sectional size of the one or more inserts 110 may be comparatively large at both ends 112, 114 to trap more pump light near the pumped ends 112, 114, and the cross-sectional size of the one or more inserts 110 may gradually decrease until reaching a minimum at a mid-point of the longitudinal length 210 of the optical fiber where the trapped pump power is to be released. In this way, absorption may be low at both ends 112 and high at the mid-point of the longitudinal length 210 of the optical fiber.

In another example, the optical fiber may be side-pumped at one or more points along the longitudinal length 210 of the optical fiber. In this case, the cross-sectional size of the one or more inserts 110 may be tuned to provide less absorption at and near each point where pump power is coupled into the optical fiber. For example, in cases where absorption along the longitudinal length 210 of the optical fiber is modulated by varying a pump scrambling rate, a cross-sectional size of the one or more inserts 110 may be smallest at and near each point where pump power is coupled into the optical fiber. Alternatively, in cases where the absorption is modulated by trapping pump light and releasing the trapped pump light downstream, the cross-sectional size of the one or more inserts 110 may be comparatively largest at and near each point where pump power is coupled into the optical fiber.

In some implementations, the geometry of the one or more inserts 110 may be varied along the longitudinal length 210 of the optical fiber in various other ways (e.g., in addition to and/or instead of varying the cross-sectional size of the one or more inserts 110). For example, in some implementations, the one or more inserts may have a helical configuration (e.g., having the shape or form of a helix or spiral) rather than the straight longitudinal configuration shown in FIG. 2, and the helical configuration may affect the pump scrambling rate and therefore modulate the absorption along the longitudinal length 210 of the optical fiber. In this case, the one or more inserts 110 may have a smaller size, or fewer inserts may be used. Additionally, or alternatively, a helical pitch of the one or more inserts 110 (e.g., a height of one complete turn of a helix, measured parallel to an axis of the helix) can be varied to modulate the pump scrambling rate in addition to and/or instead of varying the cross-sectional size of the one or more inserts 110. For example, in some implementations, a higher rotational rate (e.g., a shorter helical pitch) may typically cause an increased scrambling rate (and thus increased absorption).

In some implementations, a positioning of the one or more inserts 110 may further affect the pump scrambling rate (and thus absorption) along the longitudinal length 210 of the optical fiber). For example, in some implementations, the one or more inserts 110 may be positioned near the core 102 in order to scramble only lower-order skew modes while allowing higher-order skew modes to continue to propagate unscrambled. Alternatively, the one or more inserts 110 may be positioned near the perimeter of the inner cladding 104 to affect all pump modes, although the higher-order modes may be more affected than the lower-order modes.

Furthermore, in some cases, fiber bending may affect the pump scrambling rate (and thus absorption) along the longitudinal length 210 of the optical fiber. Accordingly, in sections of the optical fiber where low absorption is desired (e.g., near the input end), care should be taken that the optical fiber does not undergo unduly sharp bends. In sections where high pump absorption is desired (e.g., near the output end), more fiber bending can be tolerated and can in fact be used in addition to varying the geometry of the one or more inserts 110 to increase pump scrambling, increase a release of trapped pump light, and/or the like. In general, sharp fiber bending is to be minimized, however, since sharp fiber bending can also cause signal loss in the core 102 as well as mechanical stress and decreased lifetime on the optical fiber.

In some implementations, in cases where the optical fiber is a polarization-maintaining optical fiber, additional techniques may be employed to reduce or eliminate pump scrambling due to stress rods. For example, in some implementations, the pump scrambling due to stress rods may be reduced or eliminated by using smaller stress members, positioning the stress members close to the core 102, forming the stress members from a material having a refractive index equal to that of the material used to form the surrounding cladding 104, using a polarization-maintaining design that does not rely on discrete stress members, and/or the like.

In operation, pump light entering the variable-absorption optical fiber may have a reduced level of meridional modes relative to a uniform mix of modes supported by the inner cladding 104. Otherwise, if the pump light entering the optical fiber were to have a uniform mix of modes, there may be high absorption and high heating in a beginning length of the optical fiber due to absorption of the meridional modes before the meridional modes are depleted and absorption is reduced to desired levels as controlled by the geometry of the inserts 110 near the input end of the optical fiber (e.g., due to the inserts 110 having a smaller cross-sectional size, a larger helical pitch, and/or the like to provide a low pump scrambling rate near the input end of the optical fiber, due to the inserts 110 having a higher refractive index than the inner cladding 104 and a larger cross-sectional size near the input end of the optical fiber in order to provide an increased capability to trap pump light to be released downstream, and/or the like).

In some implementations, various techniques can be used to reduce a population of the meridional modes in the pump light prior to the pump light entering the optical fiber. For example, in some implementations, the pump light may be delivered from a fiber pump combiner arranged to merge outputs from multiple fiber-coupled pump diodes into one fiber. In this case, the fiber pump combiner may be designed with a twisted structure that preferentially populates skew modes in order to reduce the level of meridional modes in the pump light. Additionally, or alternatively, a microstructured pump-delivery fiber can be used to preferentially populate skew modes and thereby reduce the level of meridional modes in the pump light. Additionally, or alternatively, meridional modes can be depleted from a uniformly-mixed pump distribution using a short length of non-scrambling or low-scrambling active fiber, which may have a lower-doped and/or smaller-diameter core than the variable-absorption optical fiber, so that an absorption rate at the beginning length of the optical fiber due to the meridional modes is acceptable.

For example, in some implementations, the short length of non-scrambling or low-scrambling active fiber may be an oscillator fiber or a pre-amplifier fiber used in a monolithic master-oscillator-power-amplifier (MOPA) fiber structure. In this case, the pump light may enter a beginning length of the master-oscillator active fiber, which can have a small, single mode core (e.g., 10 microns for a 1080 nanometer laser) in a round inner cladding with no (or low) pump scrambling. Accordingly, the beginning length of the master-oscillator active fiber does not experience unacceptably high absorption while absorbing the meridional pump modes. The pump light may exit the master-oscillator active fiber largely depleted of meridional modes and then enter a power-amplifier fiber, which may have a comparatively larger core (e.g., 20 to 50 microns) and a variable-absorption design as described herein. Because there is little meridional light in the pump light that enters the power-amplifier fiber, an absorption rate at launch into the power-amplifier fiber can be controlled by the geometry of the inserts 110 (e.g., by controlling a pump scrambling rate based on the cross-sectional size and/or helical pitch of the inserts 110, by controlling a rate at which the pump light is trapped based on the cross-sectional size and/or refractive index of the inserts 110, and/or the like). In some implementations, as the pump light is depleted along the length of the power-amplifier fiber (e.g., along longitudinal length 210), the geometry of the inserts 110 can be varied to couple pump power to the core 102 at a desired rate (e.g., by gradually increasing the cross-sectional size and/or gradually decreasing the helical pitch of the inserts 110 to increase the pump scrambling rate, by gradually decreasing the cross-sectional size of the inserts 110 to release trapped pump light in cases where the inserts 110 have a higher refractive index than the inner cladding 104, and/or the like). Accordingly, in contrast to conventional MOPA designs where the cladding shape shifts from round on passive-fiber sections to octagonal or another shape on active-fiber sections and back again, some implementations described herein may always contain the pump in round fiber, which improves splice quality, reduces loss, and/or the like. Furthermore, reducing pump intensity at a front end of the master-oscillator or power-amplifier fiber helps to mediate photodarkening and mode instabilities.

Accordingly, in some implementations, the variable-absorption optical fiber described herein has a design that controls heat distribution and prevents abrupt temperature variations along the longitudinal length 210 of the optical fiber because an absorption coefficient is tuned gradually along the longitudinal length 210 of the variable-absorption optical fiber (e.g., by gradually increasing or decreasing a cross-sectional size, a helical pitch, and/or other geometric properties of the one or more inserts 110 to thereby control pump density, pump scrambling, trapping and/or releasing of pump light, and/or the like along the longitudinal length 210 of the variable-absorption optical fiber). For example, in some implementations, pump intensity can be controlled by tuning the diameters or cross-sectional sizes of the one or more inserts 110 that are formed in the inner cladding 104. In this case, the inserts 110 may have a refractive index that is lower than that of the inner cladding 104 (e.g., in the case of the pure fused silica, the one or more inserts 110 can be made from fluorine, boron, an aluminum and phosphorus combination, holes or hollow cavities, and/or the like). Furthermore, the design of the variable-absorption optical fiber may enable the absorption coefficient to be varied over the longitudinal length 210 of a single active fiber that can be a double-clad or a triple-clad fiber of any suitable size, with any suitable quantity of inserts 110 and a core 102 that can be doped using any suitable active ion(s), whereas techniques to vary absorption using conventional fiber technologies typically require fabricating and splicing together several fibers that have different active core diameters, different concentrations of active ions, and/or the like. Further still, a cross-sectional shape of the inner cladding 104 can be round throughout the longitudinal length 210, which improves and simplifies splicing, reduces splice loss to adjacent fibers, and simplifies fabrication (e.g., relative to MOPA designs where the cladding shape shifts between round on passive-fiber sections and octagonal or another shape on active-fiber sections).

As shown in FIG. 2B, in some aspects, a cross-sectional size of the core 102 and the one or more inserts 110 may vary along a longitudinal length 210 of the optical fiber to vary a pump scrambling rate and thereby modulate absorption along the longitudinal length 210 of the optical fiber. In this example 250, the optical fiber may function in a manner similar to example 200. For example, in a system where the pump is launched at end 112, the core 102 having a comparatively smaller cross-sectional size provides for moderate absorption. The cross-sectional size of the core 102 gradually increases along the longitudinal length 210 of the optical fiber, while the cross-sectional size of the one or more inserts 110 gradually decreases along the longitudinal length 210 of the optical fiber, to maximize absorption where the pump power is lower at the far (e.g., output) end 114. In general, the gradual increase of the cross-sectional size of the core 102 may cause a pump absorption rate to gradually increase from the end 112, where the pump is launched, along the longitudinal length 210 to the far (e.g., output) end 114. Other features of optical fiber 250 may be similar to those of optical fiber 200, as described herein.

While the cross-sectional size of the core 102 and/or the one or more inserts 110 may change along the longitudinal length 210 of the optical fiber, in some aspects, the outer diameter of the optical fiber may remain constant, or near constant. In other words, the increase and/or decrease in the cross-section size of the core 102 and/or the one or more inserts 110 does not cause an increase and/or decrease in the cross-sectional size of the optical fiber as a whole.

As indicated above, FIGS. 2A and 2B are provided merely as examples. Other examples may differ from what is described with regard to FIGS. 2A and 2B.

Figure 3:
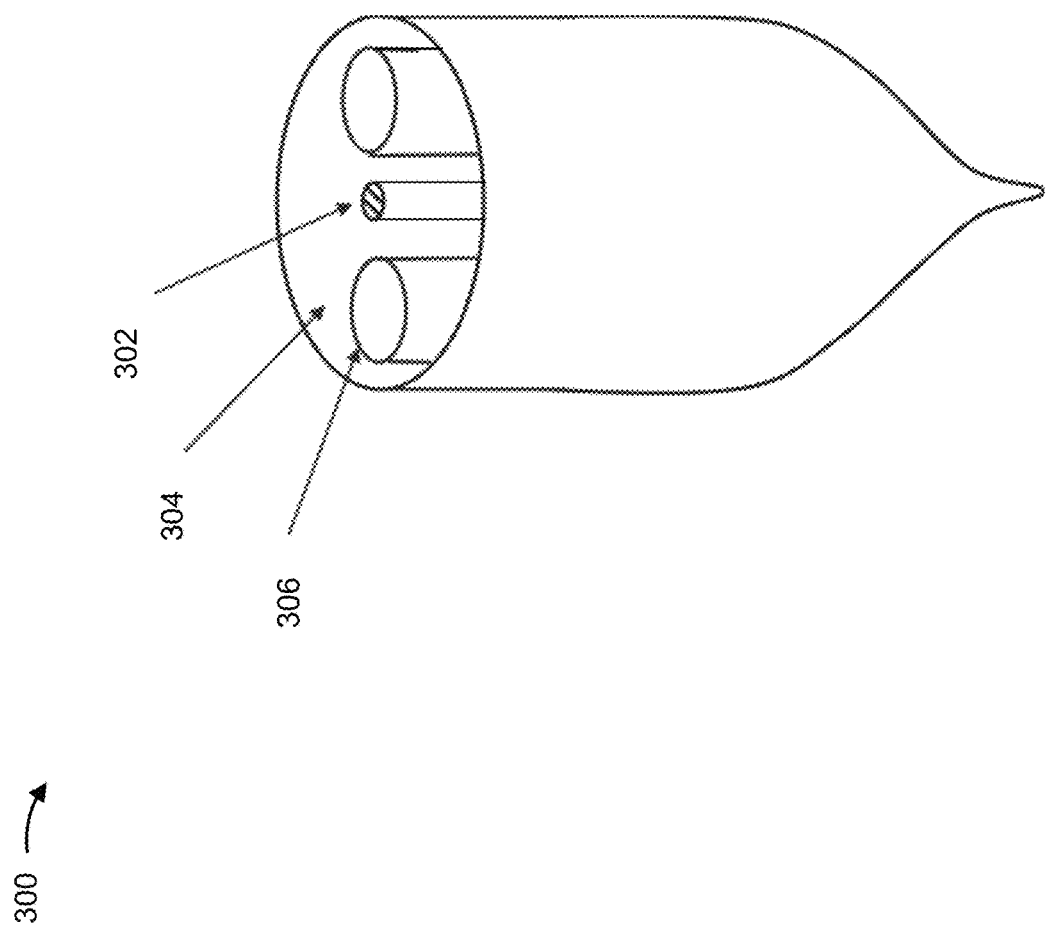
FIG. 3 is a diagram of an example implementation of a preform that can be used to fabricate an optical fiber with a variable absorption described herein.

FIG. 3 is a diagram of an example implementation of a preform 300 that can be used to fabricate an optical fiber with a variable absorption described herein. For example, in some implementations, the preform 300 may generally be constructed through chemical vapor deposition methods such as inside vapor deposition, outside vapor deposition, vapor axial deposition, and/or the like, and the preform 300 can then be placed in a device such as a drawing tower where a tip of the preform 300 is heated and the optical fiber is pulled out like a string.

In some implementations, as shown in FIG. 3, the preform 300 may include a core region 302 and a cladding region 304 that have an appropriate core-to-clad ratio (e.g., 1:2.5, 1:5, 1:10, 1:20, 1:50, and/or the like, which may cover a range from a 50 micron core in a 125 micron fiber up to a 10 micron core in a 500 micron fiber). Furthermore, in order to fabricate the one or more inserts that provide the optical fiber with a variable absorption, one or more holes 306 may be drilled or otherwise formed in the cladding region 304 of the preform 300. The one or more inserts can then be formed using various techniques.

For example, in cases where the one or more inserts are formed from a solid material, the one or more inserts can be placed into the one or more holes 306 at the start of the draw (e.g., prior to drawing the preform 300), and the one or more inserts may be fed at a varying speed relative to the preform 300, a core rod, and/or the like during a fiber drawing process, a pre-draw collapse, a sleeving process performed on a re-sleeve lathe or a caning tower, and/or the like. Accordingly, feeding the one or more inserts at a different speed than a core rod may generally cause a cross-sectional size of the one or more inserts to vary during the draw. In the case of a hollow insert, the cross-sectional size can be controlled during the draw by applying negative or positive pressure to air or gas contained in the holes 306 during a fiber draw process, during a preform collapse process, during a re-sleeve process, and/or the like. Furthermore, if the hollow inserts are to be filled with liquid, the hollow inserts can be filled with the liquid after the draw. Furthermore, if the inserts are to have a helical configuration, the inserts may be fabricated by spinning the preform 300 during the draw process, and a helical pitch of the inserts may be varied by varying a rate at which the preform 300 is spun during the draw process.

In some implementations, whether using solid inserts, hollow inserts, straight longitudinal inserts, helical inserts, and/or the like, the geometry of the inserts (e.g., cross-sectional size, helical pitch, and/or the like) may be varied at an appropriate rate to ensure that each resulting usable fiber length has a correct variation of insert geometry longitudinally. For example, as mentioned above, the geometry of the inserts may be varied by varying a speed at which solid inserts are fed through the holes 306 relative to the preform 300, a core rod, and/or the like, by varying a pressure applied to the holes 306 for hollow inserts, by spinning the preform 300 and/or varying the rate at which the preform 300 is spun for a helical insert, and/or the like. For example, when drawing a preform to generate one (1) kilometer of fiber with a fiber length per fiber laser of ten (10) meters, the size of the inserts is modulated one-hundred (100) times during the draw, and accurately over the desired fiber length in each case. Additionally, the fiber may be marked during the draw process at the beginning of each length and at the end of each length using a marking apparatus that is synchronized with one or more mechanisms used to control the geometry of the one or more inserts to enable a user to readily determine where each usable fiber length begins and ends.

In this way, the variable-absorption optical fiber described herein has a design that enables absorption to be controlled using only one single fiber that can be manufactured using one single core preform (e.g., preform 300). Furthermore, the features that enable variable absorption in the optical fiber (e.g., varying the geometry of the inserts, the positioning of the inserts, and/or the like) can be implemented during manufacturing of the preform 300 or during the fiber draw. In addition, fabrication of the variable-absorption optical fiber may be simplified because the cladding region 304 is round throughout an entire length of the optical fiber, whereas other fiber designs are fabricated using preforms that provide a cladding shape that shifts between round on passive-fiber sections and octagonal or another shape on active-fiber sections.

As indicated above, FIG. 3 is provided merely as one or more examples. Other examples may differ from what is described with regard to FIG. 3.

Figure 4:
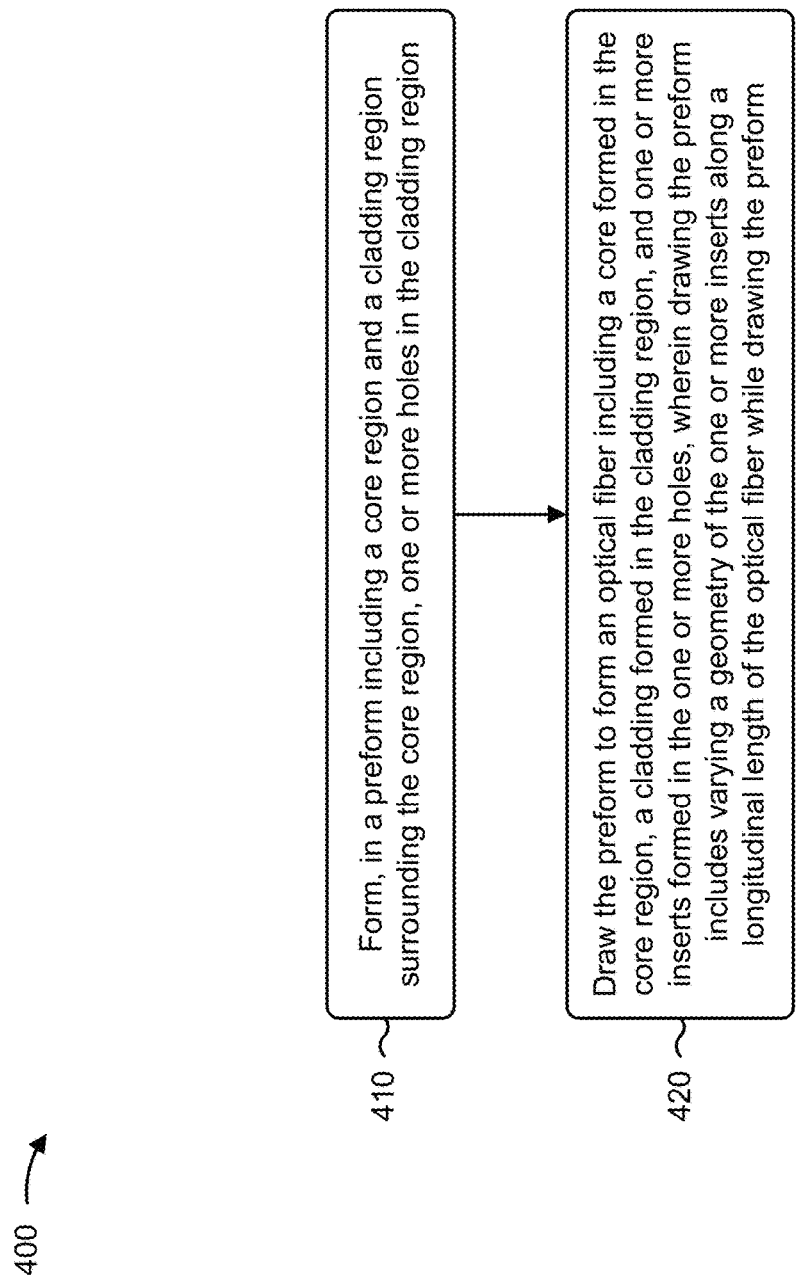
FIG. 4 is a flowchart of an example process for fabricating an optical fiber with a variable absorption described herein.

FIG. 4 is a flowchart of an example process for fabricating an optical fiber with a variable absorption described herein. In some implementations, one or more process blocks shown in FIG. 4 may be performed by one or more optical fiber fabrication machines, such as a chemical vapor deposition device, a drill, a drawing tower, a re-sleeve lathe, a caning tower, and/or the like.

As shown in FIG. 4, process 400 may include forming, in a preform including a core region and a cladding region surrounding the core region, one or more holes in the cladding region (block 410). For example, as described above, a variable-absorption optical fiber may be fabricated by forming, in a preform 300 including a core region 302 and a cladding region 304 surrounding the core region 302, one or more holes 306 in the cladding region 304.

As further shown in FIG. 4, process 400 may include drawing the preform to form an optical fiber including a core formed in the core region, a cladding formed in the cladding region, and one or more inserts formed in the one or more holes, wherein drawing the preform includes varying a geometry of the one or more inserts along a longitudinal length of the optical fiber while drawing the preform (block 420). For example, as described above, the preform 300 may be drawn to form an optical fiber including a core 102 formed in the core region 302, a cladding 104 formed in the cladding region 304, and one or more inserts 110 formed in the one or more holes 306. In some implementations, drawing the preform 300 includes varying a geometry of the one or more inserts 110 along a longitudinal length 210 of the optical fiber while drawing the preform 300.

Process 400 may include additional implementations, such as any single implementation or any combination of implementations described below and/or in connection with one or more other processes described elsewhere herein.

In a first implementation, varying the geometry of the one or more inserts 110 along the longitudinal length 210 of the optical fiber may include placing the one or more inserts 110 in the one or more holes 306 prior to drawing the preform 300 and feeding the one or more inserts 110 through the one or more holes 306 at a varying speed relative to the preform 300 to vary a cross-sectional size of the one or more inserts 110 along the longitudinal length 210 of the optical fiber.

In a second implementation, either alone or in combination with the first implementation, varying the geometry of the one or more inserts 110 along the longitudinal length 210 of the optical fiber may include filling the one or more holes 306 with a gas prior to drawing the preform 300 and modulating a pressure applied to the gas in the one or more holes 306 while drawing the preform 300 to vary a cross-sectional size of the one or more inserts 110 along the longitudinal length 210 of the optical fiber.

In a third implementation, alone or in combination with one or more of the first and second implementations, varying the geometry of the one or more inserts 110 along the longitudinal length 210 of the optical fiber may include spinning the preform 300 while the preform 300 is drawn to form the one or more inserts 110 with a helical configuration.

In a fourth implementation, alone or in combination with one or more of the first through third implementations, varying the geometry of the one or more inserts 110 along the longitudinal length 210 of the optical fiber may include varying a rate at which the preform 300 is spun while the preform 300 is drawn to vary a helical pitch of the one or more inserts 110 along the longitudinal length 210 of the optical fiber.

In a fifth implementation, alone or in combination with one or more of the first through fourth implementations, drawing the preform 300 to form the optical fiber may further include marking the optical fiber at a beginning of the longitudinal length 210 of the optical fiber and at an end of the longitudinal length 210 of the optical fiber (e.g., at ends 112, 114) using a marking apparatus that is synchronized with one or more mechanisms to vary the geometry of the one or more inserts 110.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
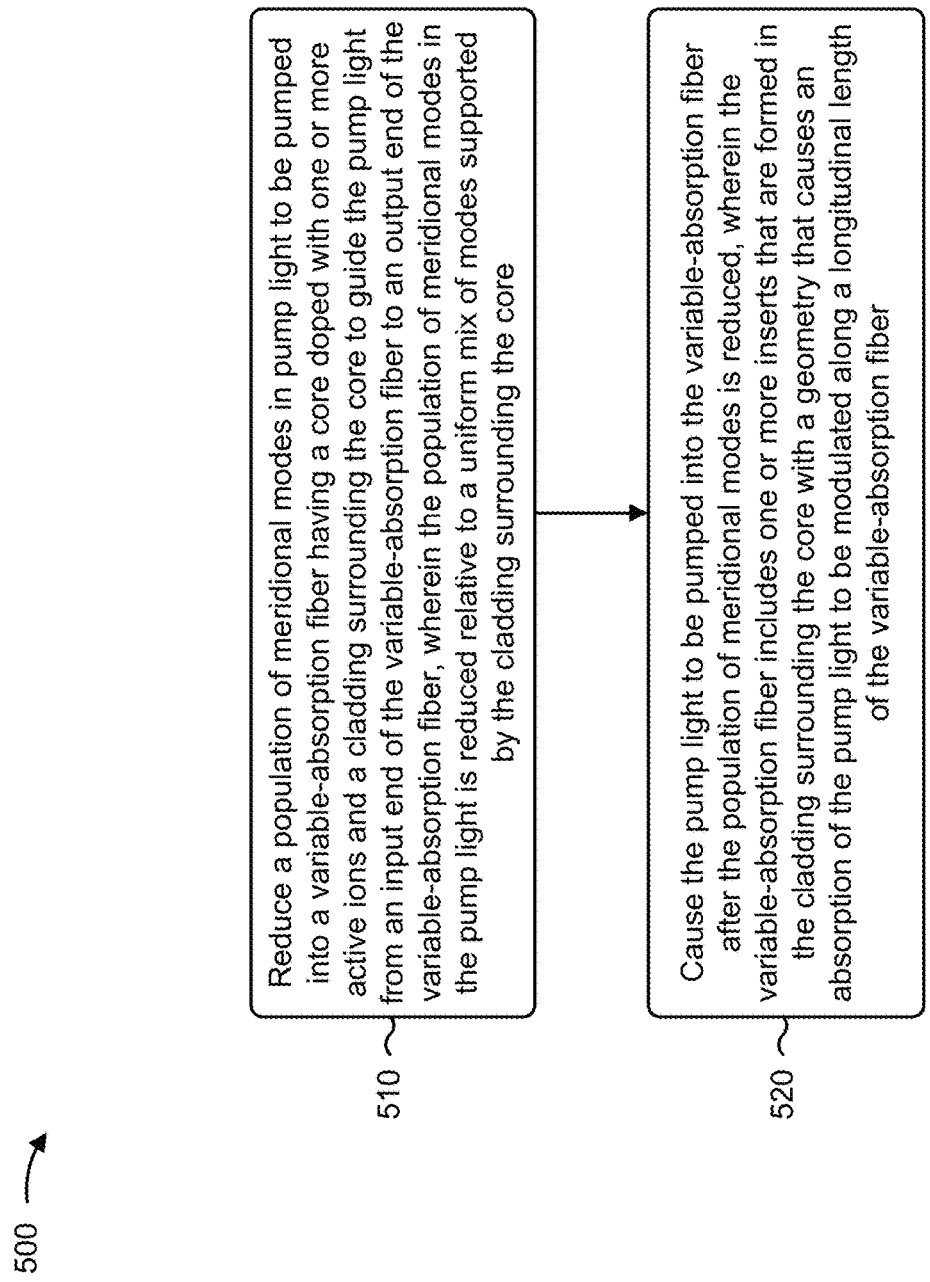
FIG. 5 is a flowchart of an example process for using an optical fiber with a variable absorption described herein.

FIG. 5 is a flowchart of an example process for using an optical fiber with a variable absorption described herein. In some implementations, one or more process blocks shown in FIG. 5 may be performed by one or more fiber optic devices, such as a fiber laser, a fiber pump combiner, one or more fiber-coupled pump diodes, a micro-structured pump-delivery fiber, a master-oscillator or pre-amplifier fiber, and/or the like.

As shown in FIG. 5, process 500 may include reducing a population of meridional modes in pump light to be pumped into a variable-absorption fiber having a core doped with one or more active ions and a cladding surrounding the core to guide the pump light from a input end of the variable-absorption fiber to an output end of the variable-absorption fiber, wherein the population of meridional modes in the pump light is reduced relative to a uniform mix of modes supported by the cladding surrounding the core (block 510). For example, as described above, a population of meridional modes may be reduced in pump light to be pumped into a variable-absorption fiber having a core 102 doped with one or more active ions and a cladding 104 surrounding the core 102 to guide the pump light from a input end (e.g., end 112 and/or 114) of the variable-absorption fiber to an output end (e.g., end 112 and/or 114) of the variable-absorption fiber. In some implementations, the population of meridional modes in the pump light is reduced relative to a uniform mix of modes supported by the cladding 104 surrounding the core 102.

As further shown in FIG. 5, process 500 may include causing the pump light to be pumped into the variable-absorption fiber after the population of meridional modes is reduced, wherein the variable-absorption fiber includes one or more inserts that are formed in the cladding surrounding the core with a geometry that causes an absorption of the pump light to be modulated along a longitudinal length of the variable-absorption fiber (block 520). For example, as described above, the pump light may be pumped into the variable-absorption fiber after the population of meridional modes in the signal light is reduced. In some implementations, the variable-absorption fiber includes one or more inserts 110 that are formed in the cladding 104 surrounding the core 102 with a geometry that causes an absorption of the pump light to be modulated along a longitudinal length 210 of the variable-absorption fiber.

Process 500 may include additional implementations, such as any single implementation or any combination of implementations described below and/or in connection with one or more other processes described elsewhere herein.

In a first implementation, reducing the population of meridional modes in the pump light may include causing the pump light to enter one or more of an oscillator fiber or a pre-amplifier fiber that depletes the pump light of meridional modes prior to the pump light entering the variable-absorption fiber.

In a second implementation, alone or in combination with the first implementation, reducing the population of meridional modes in the pump light may include generating the pump light using a fiber pump combiner that has a twisted structure to populate skew modes in outputs from a plurality of fiber-coupled pump diodes.

In a third implementation, alone or in combination with one or more of the first and second implementations, reducing the population of meridional modes in the pump light may include generating the pump light using a micro-structured pump-delivery fiber adapted to populate skew modes in the pump light.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
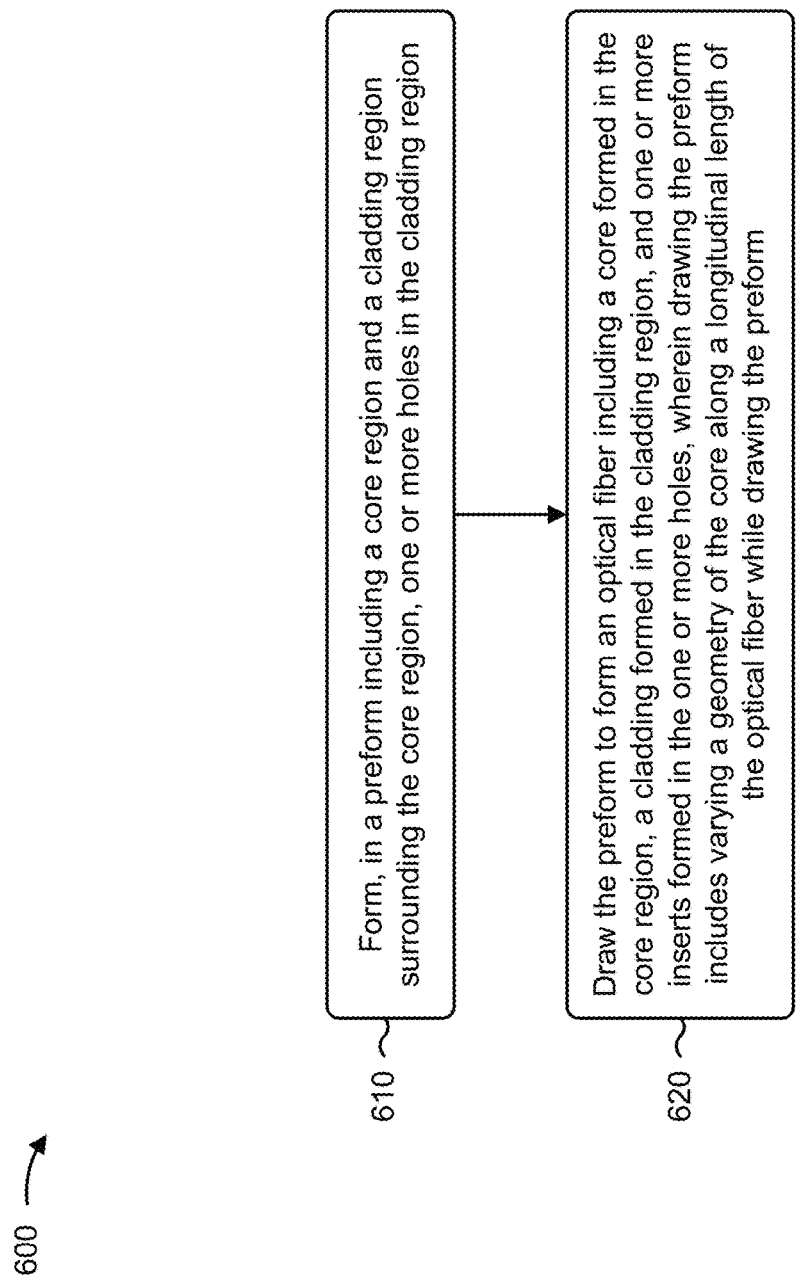
FIG. 6 is a flowchart of an example process for fabricating an optical fiber with a variable absorption described herein.

FIG. 6 is a flowchart of an example process for fabricating an optical fiber with a variable absorption described herein. In some implementations, one or more process blocks shown in FIG. 6 may be performed by one or more optical fiber fabrication machines, such as a chemical vapor deposition device, a drill, a drawing tower, a re-sleeve lathe, a caning tower, and/or the like.

As shown in FIG. 6, process 600 may include forming, in a preform including a core region and a cladding region surrounding the core region, one or more holes in the cladding region (block 610). For example, as described above, a variable-absorption optical fiber may be fabricated by forming, in a preform 300 including a core region 302 and a cladding region 304 surrounding the core region 302, one or more holes 306 in the cladding region 304.

As further shown in FIG. 6, process 600 may include drawing the preform to form an optical fiber including a core formed in the core region, a cladding formed in the cladding region, and one or more inserts formed in the one or more holes, wherein drawing the preform includes varying a geometry of the core along a longitudinal length of the optical fiber while drawing the preform (block 620). For example, as described above, the preform 300 may be drawn to form an optical fiber including a core 102 formed in the core region 302, a cladding 104 formed in the cladding region 304, and one or more inserts 110 formed in the one or more holes 306. In some implementations, drawing the preform 300 includes varying a geometry of the core 102, by varying a geometry of the one or more inserts 110 along a longitudinal length 210 of the optical fiber while drawing the preform 300.

Process 600 may include additional implementations, such as any single implementation or any combination of implementations described below and/or in connection with one or more other processes described elsewhere herein.

In a first implementation, varying the geometry of the core 102 along the longitudinal length 210 of the optical fiber may include placing the one or more inserts 110 in the one or more holes 306 prior to drawing the preform 300 and feeding the one or more inserts 110 through the one or more holes 306 at a varying speed relative to the preform 300 to vary a cross-sectional size of the one or more inserts 110 along the longitudinal length 210 of the optical fiber. For example, a variation in the cross-sectional size of the one or more inserts 110 may put pressure on the core 102 to cause variation in the cross-sectional size of the core 102 along the longitudinal length 210 of the optical fiber. In some aspects, the cross-sectional size of the core 102 may change at a rate inversely related (e.g., inversely proportional, or substantially inversely proportional) to the rate of change in the cross-sectional size of the one or more inserts 110. For example, as the cross-sectional size of the one or more inserts 110 increases, the cross-sectional size of the core 102 decreases, and as the cross-sectional size of the one or more inserts 110 decreases, the cross-sectional size of the core 102 increases.

In a second implementation, either alone or in combination with the first implementation, varying the geometry of the core 102 along the longitudinal length 210 of the optical fiber may include filling the one or more holes 306 with a gas prior to drawing the preform 300 and modulating a pressure applied to the gas in the one or more holes 306 while drawing the preform 300 to vary a cross-sectional size of the one or more inserts 110 along the longitudinal length 210 of the optical fiber, which may cause a variation in the cross-sectional seize of the core 102, as described herein.

In a third implementation, alone or in combination with one or more of the first and second implementations, varying the geometry of the core 102 along the longitudinal length 210 of the optical fiber may include spinning the preform 300 while the preform 300 is drawn to form the one or more inserts 110 with a helical configuration.

In a fourth implementation, alone or in combination with one or more of the first through third implementations, varying the geometry of the core 102 along the longitudinal length 210 of the optical fiber may include varying a rate at which the preform 300 is spun while the preform 300 is drawn to vary a helical pitch of the one or more inserts 110 along the longitudinal length 210 of the optical fiber.

In a fifth implementation, alone or in combination with one or more of the first through fourth implementations, drawing the preform 300 to form the optical fiber may further include marking the optical fiber at a beginning of the longitudinal length 210 of the optical fiber and at an end of the longitudinal length 210 of the optical fiber (e.g., at ends 112, 114) using a marking apparatus that is synchronized with one or more mechanisms to vary the geometry of the core and/or the one or more inserts 110.

In a sixth implementation, alone or in combination with one or more of the first through fifth implementations, a rate at which a cross-sectional size of the core 102 varies along the longitudinal length 210 of the optical fiber is inversely related to a rate at which a cross-sectional size of the one or more inserts 110 varies along the longitudinal length 210 of the optical fiber.

In a seventh implementation, alone or in combination with one or more of the first through sixth implementations, drawing the preform may include drawing the preform using a closed-loop feedback mechanism to maintain a substantially constant outer diameter of the optical fiber along the longitudinal length of the optical fiber while the geometry of the core varies.

In an eighth implementation, alone or in combination with one or more of the first through seventh implementations, the one or more inserts may be comprised of a doped glass having a lower melting point than the preform, such that, when drawing the preform, the one or more inserts have a lower viscosity than the preform and are more easily fed through the one or more holes with a speed differential. In some implementations, a dopant, of the doped glass, may be one or more of: phosphorous, germanium, fluorine, or boron.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide an optical fiber that includes a core 102 doped with one or more active ions to guide signal light from an input end of the optical fiber to an output end of the optical fiber, a cladding 104 surrounding the core 102 to guide pump light from the input end of the optical fiber to the output end of the optical fiber, and one or more inserts 110 formed in the cladding 104 surrounding the core 102. In some implementations, as described above, each of the one or more inserts 110 may have a geometry that varies along a longitudinal length 210 of the optical fiber, and the geometry of the one or more inserts 110 may be varied along the longitudinal length 210 of the optical fiber to cause an absorption of the pump light to be modulated along the longitudinal length 210 of the optical fiber.

For example, in some implementations, the geometry of the one or more inserts 110 that varies along the longitudinal length 210 of the optical fiber may include a cross-sectional size of the one or more inserts 110, which may increase from the input end to the output end of the optical fiber, as described above. In this case, as shown in FIGS. 1A-1B and FIG. 2, the optical fiber may include a first end 112 arranged to be the input end and a second end 114 arranged to be the output end. Furthermore, the cross-sectional size of the one or more inserts 110 may increase from the input end to the output end of the optical fiber to cause a pump scrambling rate to increase from the input end of the optical fiber to the output end of the optical fiber and thereby cause the absorption of the pump light to increase along the longitudinal length 210 of the optical fiber. In some implementations, the pump scrambling rate may depend on a positioning of the one or more inserts 110 relative to one or more of the core 102 or a perimeter of the cladding 104.

In some implementations, as described above, at least one insert 110 of the one or more inserts 110 may have a first refractive index, the cladding 104 surrounding the core 102 may have a second refractive index, and the first refractive index may be higher than the second refractive index. In this case, the cross-sectional size of the at least one insert 110 may decrease from the input end to the output end of the optical fiber, and the first end 112 may be arranged to be the output end and the second end 114 may be arranged to be the input end. Furthermore, the first refractive index being higher than the second refractive index may cause the pump light to be trapped in the at least one insert 110, and the cross-sectional size of the at least one insert 110 may decrease from the input end to the output end of the optical fiber to cause the trapped pump light to be released downstream from the input end of the optical fiber and into the cladding 104 along the longitudinal length 210 of the optical fiber.

In some implementations, as described above, the optical fiber may be pumped at multiple locations along the longitudinal length 210 of the optical fiber, and the geometry of the one or more inserts 110 may vary along the longitudinal length 210 of the optical fiber to provide a decrease in the absorption of the pump light in one or more regions that are proximal to the multiple locations where the optical fiber is pumped.

In some implementations, in addition to and/or rather than the cross-sectional size of the one or more inserts 110, the geometry of the one or more inserts 110 that varies along the longitudinal length 210 of the optical fiber may include a helical pitch that varies along the longitudinal length 210 of the optical fiber, as described above.

In some implementations, as described above, the one or more inserts 110 may have a first refractive index that differs from a second refractive index of the cladding 104.

In some implementations, as described above, the one or more inserts 110 may include one or more cavities that contain one or more of a solid, a liquid, or a gas.

Some implementations described herein provide an optical fiber that includes a core 102 doped with one or more active ions to guide signal light from an input end of the optical fiber to an output end of the optical fiber, a cladding 104 surrounding the core 102 to guide pump light from the input end of the optical fiber to the output end of the optical fiber, and one or more inserts 110 formed in the cladding 104 surrounding the core 102. In some implementations, as described above, each of the core 102 may have a geometry that varies along a longitudinal length 210 of the optical fiber, and the geometry of the core 102 may be varied along the longitudinal length 210 of the optical fiber to cause an absorption of the pump light to be modulated along the longitudinal length 210 of the optical fiber.

For example, in some implementations, the geometry of the core 102 that varies along the longitudinal length 210 of the optical fiber may include a cross-sectional size of the core 102, which may increase from the input end to the output end of the optical fiber, as described above. In this case, as shown in FIG. 1C and FIG. 2B, the optical fiber may include a first end 112 arranged to be the input end and a second end 114 arranged to be the output end. Furthermore, the cross-sectional size of the core 102 may increase from the input end to the output end of the optical fiber to cause the absorption of the pump light to increase along the longitudinal length 210 of the optical fiber. In some implementations, the pump scrambling rate may depend on a positioning of the one or more inserts 110 relative to one or more of the core 102 or a perimeter of the cladding 104.

In some implementations, as described above, at least one insert 110 of the one or more inserts 110 may have a first refractive index, the cladding 104 surrounding the core 102 may have a second refractive index, and the first refractive index may be higher than the second refractive index. In this case, a cross-sectional size of the at least one insert 110 may decrease from the input end to the output end of the optical fiber. Furthermore, the first refractive index being higher than the second refractive index may cause the pump light to be trapped in the at least one insert 110, and the cross-sectional size of the at least one insert 110 may decrease from the input end to the output end of the optical fiber to cause the trapped pump light to be released downstream from the input end of the optical fiber and into the cladding 104 along the longitudinal length 210 of the optical fiber.

In some implementations, as described above, the optical fiber may be pumped at multiple locations along the longitudinal length 210 of the optical fiber, and the geometry of the core 102 may vary along the longitudinal length 210 of the optical fiber to provide a decrease in the absorption of the pump light in one or more regions that are proximal to the multiple locations where the optical fiber is pumped.

In some implementations, as described above, an outer diameter of the optical fiber remains substantially constant along the longitudinal length of the optical fiber.

In some implementations, as described above, the one or more inserts 110 may have a first refractive index that differs from a second refractive index of the cladding 104.

In some implementations, as described above, the one or more inserts 110 may include one or more cavities that contain one or more of a solid, a liquid, or a gas.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical fiber, comprising:
   a core doped with one or more active ions to guide signal light from an input end of the optical fiber to an output end of the optical fiber;
   a cladding surrounding the core to guide pump light from the input end of the optical fiber to the output end of the optical fiber; and
   one or more inserts formed in the cladding surrounding the core,
      wherein the core has a geometry that varies along a longitudinal length of the optical fiber, and
      wherein the geometry of the core is varied along the longitudinal length of the optical fiber to cause an absorption of the pump light to be modulated along the longitudinal length of the optical fiber,
wherein the geometry of the core that varies along the longitudinal length of the optical fiber comprises a cross-sectional size of the core that increases from the input end to the output end of the optical fiber.

2. The optical fiber of claim 1, wherein the cross-sectional size of the core increases from the input end to the output end of the optical fiber to cause the absorption of the pump light to increase along the longitudinal length of the optical fiber.

3. The optical fiber of claim 1, wherein at least one insert of the one or more inserts has a first refractive index, wherein the cladding surrounding the core has a second refractive index, wherein the first refractive index is higher than the second refractive index, and wherein a cross-sectional size of the at least one insert decreases from the input end to the output end of the optical fiber.

4. The optical fiber of claim 3, wherein the first refractive index being higher than the second refractive index causes the pump light to be trapped in the at least one insert, and wherein the cross-sectional size of the at least one insert decreases from the input end to the output end of the optical fiber to cause the trapped pump light to be released downstream from the input end of the optical fiber and into the cladding along the longitudinal length of the optical fiber.

5. The optical fiber of claim 1, wherein the optical fiber is to be pumped at multiple locations along the longitudinal length of the optical fiber, and wherein the geometry of the core varies along the longitudinal length of the optical fiber to provide a decrease in the absorption of the pump light in one or more regions that are proximal to the multiple locations.

6. The optical fiber of claim 1, wherein an outer diameter of the optical fiber remains substantially constant along the longitudinal length of the optical fiber.

7. The optical fiber of claim 1, wherein the one or more inserts have a first refractive index that differs from a second refractive index of the cladding.

8. The optical fiber of claim 1, wherein the one or more inserts comprise one or more cavities that contain one or more of a solid, a liquid, or a gas.

9. A method of manufacturing the optical fiber of claim 1, comprising:
   forming, in a preform comprising a core region doped with one or more active ions and a cladding region surrounding the core region, one or more holes in the cladding region; and
   drawing the preform to form the optical fiber comprising the core formed in the core region, the cladding formed in the cladding region, and the one or more inserts formed in the one or more holes,
      wherein drawing the preform comprises varying the geometry of the one or more inserts along the longitudinal length of the optical fiber while drawing the preform.

10. The method of claim 9, wherein varying the geometry of the one or more inserts along the longitudinal length of the optical fiber comprises:
   placing the one or more inserts in the one or more holes prior to drawing the preform; and
   feeding the one or more inserts through the one or more holes at a varying speed relative to the preform to vary a cross-sectional size of the one or more inserts along the longitudinal length of the optical fiber.

11. The method of claim 9, wherein varying the geometry of the one or more inserts along the longitudinal length of the optical fiber comprises:
   filling the one or more holes with a gas prior to drawing the preform; and
   modulating a pressure applied to the gas in the one or more holes while drawing the preform to vary a cross-sectional size of the one or more inserts along the longitudinal length of the optical fiber.

12. The method of claim 9, wherein varying the geometry of the one or more inserts along the longitudinal length of the optical fiber comprises:
   spinning the preform while the preform is drawn to form the one or more inserts with a helical configuration.

13. The method of claim 12, wherein varying the geometry of the one or more inserts along the longitudinal length of the optical fiber further comprises:
   varying a rate at which the preform is spun while the preform is drawn to vary a helical pitch of the one or more inserts along the longitudinal length of the optical fiber.

14. The method of claim 9, wherein the drawing the preform to form the optical fiber further comprises:
   marking the optical fiber at a beginning of the longitudinal length of the optical fiber and at an end of the longitudinal length of the optical fiber using a marking apparatus that is synchronized with one or more mechanisms to vary the geometry of the one or more inserts.

15. A method of manufacturing the optical fiber of claim 1, comprising:
   forming, in a preform comprising a core region doped with one or more active ions and a cladding region surrounding the core region, one or more holes in the cladding region; and
   drawing the preform to form the optical fiber comprising the core formed in the core region, the cladding formed in the cladding region, and the one or more inserts formed in the one or more holes,
      wherein drawing the preform comprises varying the geometry of the core along the longitudinal length of the optical fiber while drawing the preform.

16. The method of claim 15, wherein varying the geometry of the core along the longitudinal length of the optical fiber comprises:
   placing the one or more inserts in the one or more holes prior to drawing the preform; and
   feeding the one or more inserts through the one or more holes at a varying speed relative to the preform to vary the cross-sectional size of the core along the longitudinal length of the optical fiber.

17. The method of claim 15, wherein varying the geometry of the core along the longitudinal length of the optical fiber comprises:
   filling the one or more holes with a gas prior to drawing the preform; and
   modulating a pressure applied to the gas in the one or more holes while drawing the preform to vary the cross-sectional size of the core along the longitudinal length of the optical fiber.

18. The method of claim 15, wherein a rate at which the cross-sectional size of the core varies along the longitudinal length of the optical fiber is inversely related to a rate at which a cross-sectional size of the one or more inserts varies along the longitudinal length of the optical fiber.

19. The method of claim 15, wherein drawing the preform comprises:

drawing the preform using a closed-loop feedback mechanism to maintain a substantially constant outer diameter of the optical fiber along the longitudinal length of the optical fiber while the geometry of the core varies.

20. The method of claim 15, wherein the one or more inserts are comprised of a doped glass having a lower melting point than the preform, such that, when drawing the preform, the one or more inserts have a lower viscosity than the preform and are more easily fed through the one or more holes with a speed differential.

21. The method of claim 20, wherein a dopant, of the doped glass, comprises one or more of:
phosphorous,
germanium,
fluorine, or
boron.

\* \* \* \* \*